C. W. ASBURY.
CHERRY STONER.
APPLICATION FILED APR. 4, 1917.
1,226,438.
Patented May 15, 1917.
2 SHEETS—SHEET 2.
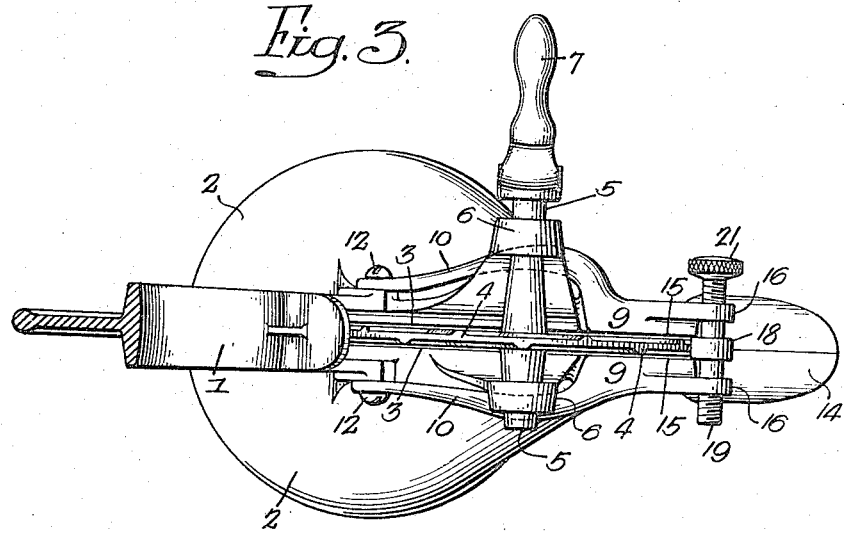
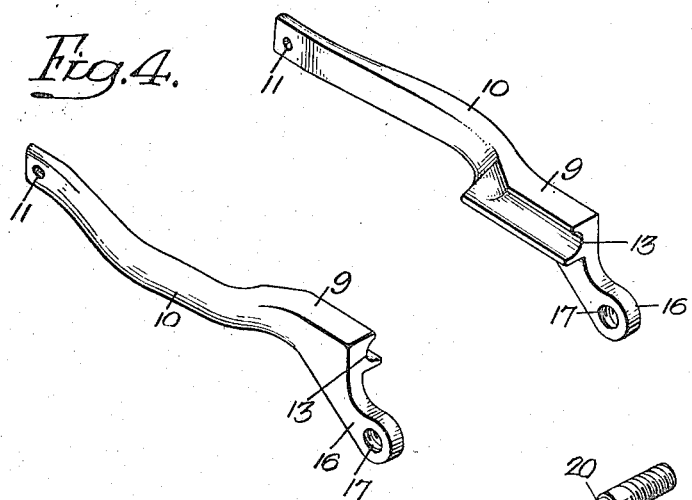
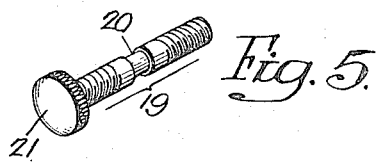
Inventor—
Charles W. Asbury.
by his Attorneys—
Howson & Howson

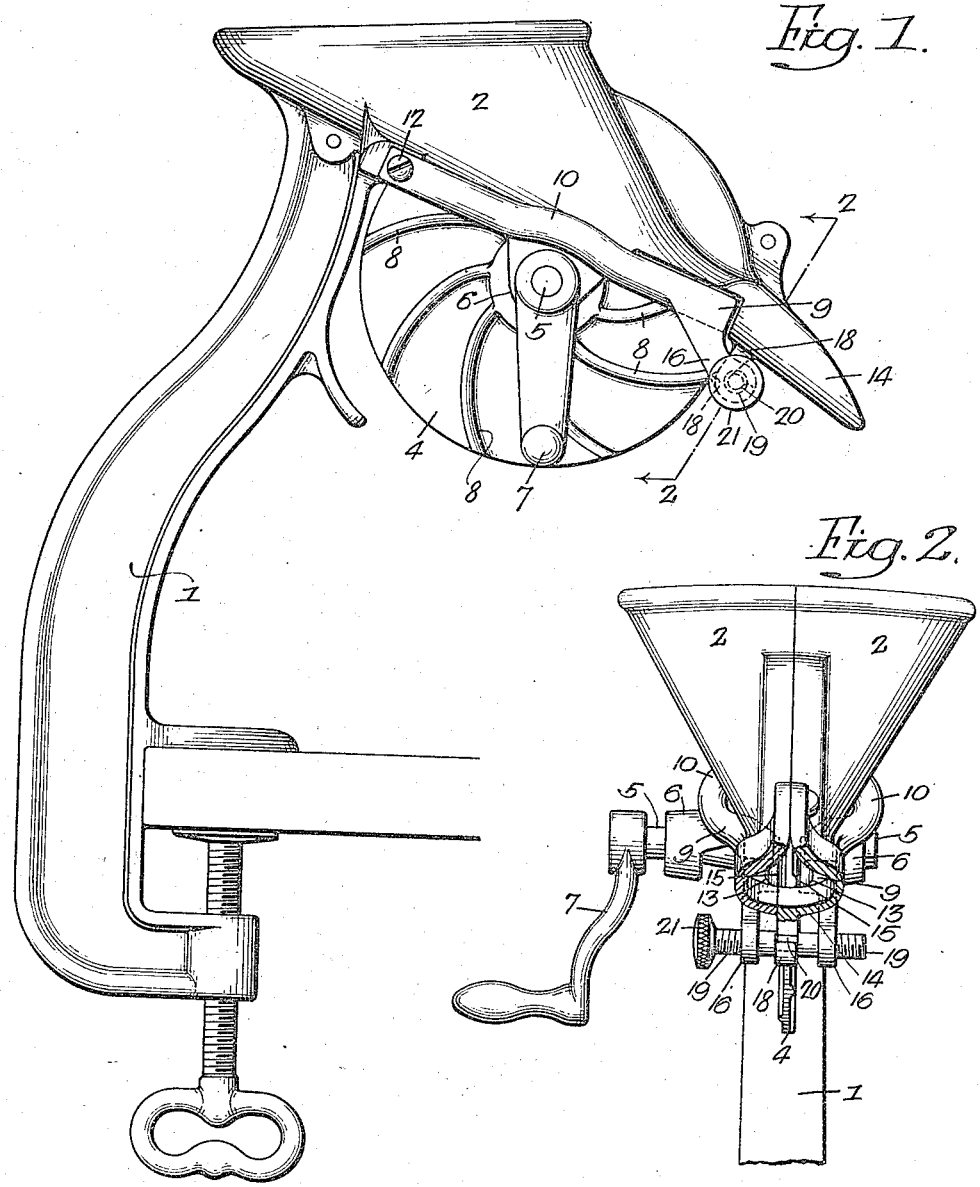

UNITED STATES PATENT OFFICE.

CHARLES W. ASBURY, OF OAK LANE, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

CHERRY-STONER.

1,226,438.  Specification of Letters Patent.  Patented May 15, 1917.

Application filed April 4, 1917.  Serial No. 159,653.

*To all whom it may concern:*

Be it known that I, CHARLES W. ASBURY, a citizen of the United States, residing in Oak Lane, Montgomery county, Pennsylvania, have invented certain Improvements in Cherry-Stoners, of which the following is a specification.

My invention relates to certain improvements in cherry stoners, such as that described in the patent to J. G. Baker, No. 724,241, dated March 31st, 1903, in which means were provided for adjusting the throat of the cherry stoner so that it could be adjusted to properly stone cherries of different sizes. In the machine of this patent, the throat pieces were independently adjustable and in many cases the operator would adjust one without adjusting the other, or adjust one more than the other, so that the cherries would not be properly stoned.

One object of my invention is to provide means for simultaneously adjusting both cheek pieces toward and from the stoning disk.

A further object of the invention is to reduce the cost of manufacture and to simplify the mechanism.

In the accompanying drawings:—

Figure 1, is a side view of my improved cherry stoner;

Fig. 2, is a sectional view on the line 2—2, Fig. 1;

Fig. 3, is an inverted plan view partly in section;

Fig. 4, is a perspective view of the throat pieces; and

Fig. 5, is a detached perspective view of the adjusting screw.

1 is a standard for supporting the hopper 2, which is made in the usual manner. The hopper is slotted at 3 for the reception of the disk 4 having trunnions 5, which are mounted in bearings 6 in the frame of the hopper. On one of the trunnions is a handle 7 by which the disk is turned. The disk has a series of curved ribs 8 on each side, as clearly shown in the drawings, which engage the meat of the cherry.

9, 9 are the throat pieces having rearwardly extending arms 10 in which are holes 11. 12, 12 are screws which hold the throat pieces to the frame of the machine. The throat pieces are shaped so as to pass around the bearings 6 and have throat sections 13 curved as shown, to allow for the passage of the stones and the pulp of the cherries. These throat sections are located one on each side of the disk 4 and the passage formed by the throat section communicates with a discharge spout 14 for the passage of the stones after the meat has been removed from them. The meat of the cherry is carried down through the slots 15 at the base of the throat sections by the disk and drops into a suitable receptacle in the ordinary manner.

On each throat piece is an extension 16 having a threaded opening 17, and projecting from the under side of the discharge spout is a hooked extension 18 adapted to receive the adjusting screw 19. This adjusting screw is reduced at 20 and this reduced portion is of a width to pass into the hooked extension 18 and to prevent the adjusting screw moving longitudinally. The adjusting screw has on one end a right angled screw and on the other end a left hand screw, and the threaded openings in the throat pieces are correspondingly threaded.

21 is a head on the screw by which it is turned. On turning the screw in one direction, the throat pieces are moved simultaneously toward each other and the disk 4 and, on the reverse movement, they are simultaneously separated, insuring the proper spacing of the throat pieces so that the portions of the throat on each side of the disk are the same.

The cherries to be stoned are fed into the hopper 2 and the disk 4 is turned by the handle. The cherries are drawn into the throat between the sections 13 of the throat pieces and the meat is drawn from the stones, owing to the fact that the opening 15 in the throat section is narrower than the diameter of the stones and the stones pass through the space between the throat pieces and out through the spout 14, while the meat is carried with the disk and is discharged into a suitable receptacle under the overhanging portion of the machine.

If the cherry stones are small, the throat pieces are adjusted toward the wheel, but, if the stones are large, they are adjusted away from the wheel so as to increase the width of the throat and to prevent, as much as possible, the mashing of the meat of the cherries.

I claim:—

1. The combination in a cherry stoner, of a hopper; two throat pieces forming a throat into which the cherries are fed; a disk; means for rotating the disk, said disk being located at the bottom of the hopper and in the throat between the two throat pieces; and means for simultaneously adjusting the throat pieces so that the width of the throat on each side of the disk will be the same.

2. The combination in a cherry stoner, of a hopper; a disk; means for turning the disk, said disk extending into the hopper; two throat pieces pivoted to the hopper located one on each side of the disk and forming the throat through which the cherries are fed, said throat pieces having curved throat sections at the disk; a spout forming a continuation of the throat and through which the stones pass; a projection on the spout; and an adjusting screw having right hand and left hand threads, the throat pieces having threaded openings corresponding to the threads of the screw so that when the screw is turned in one direction the throat pieces are simultaneously separated and when turned in the opposite direction they are simultaneously moved toward each other.

3. The combination in a cherry stoner, of a frame; a hopper mounted on the frame and slotted; a disk extending through the slot in the hopper; means for turning the disk; two throat pieces, one pivoted on each side of the hopper, the throat pieces having curved throat sections on each side of the disk and each having an extension with a threaded opening; a spout forming a continuation of the throat and through which the stones are discharged; a hooked projection; a right hand thread on one end of the screw and a left hand thread on the other end of the screw, said screw having a head by which it is turned, the threaded portions of the screw being adapted to the threaded openings in the extensions of the throat pieces so that said throat pieces are simultaneously adjusted toward and from each other.

In witness whereof I affix my signature.

CHARLES W. ASBURY.

Copies of this patent may be obtained for five cents each, by addressing the "Commissioner of Patents, Washington, D. C."